(12) United States Patent
Robinson (10) Patent No.: US 9,365,303 B2
(45) Date of Patent: Jun. 14, 2016

(54) POSITION AND ELEVATION ACQUISITION FOR ORBIT DETERMINATION

(75) Inventor: Ian S. Robinson, Redondo Beach, CA (US)

(73) Assignee: Raytheon Company, Waltham, MA (US)

( * ) Notice: Subject to any disclaimer, the term of this patent is extended or adjusted under 35 U.S.C. 154(b) by 1067 days.

(21) Appl. No.: 13/463,522

(22) Filed: May 3, 2012

(65) Prior Publication Data

US 2013/0293413 A1    Nov. 7, 2013

(51) Int. Cl.
| | |
|---|---|
| *B64G 3/00* | (2006.01) |
| *G01S 19/02* | (2010.01) |
| *G01S 7/00* | (2006.01) |
| *G01S 5/02* | (2010.01) |
| *G01S 13/79* | (2006.01) |
| *G01S 5/12* | (2006.01) |

(52) U.S. Cl.
CPC .................. *B64G 3/00* (2013.01); *G01S 5/0294* (2013.01); *G01S 5/12* (2013.01); *G01S 7/003* (2013.01); *G01S 13/79* (2013.01); *G01S 19/02* (2013.01)

(58) Field of Classification Search
CPC ....... G01S 19/02; G01S 5/0294; G01S 13/79; G01S 7/003; G01S 5/12; B64G 3/00; H04B 7/18519
USPC .................................................... 342/357.95
See application file for complete search history.

(56) References Cited

U.S. PATENT DOCUMENTS

| | | | |
|---|---|---|---|
| 3,860,921 A * | 1/1975 | Fletcher et al. ............... 342/109 |
| 5,570,096 A * | 10/1996 | Knight et al. ............ 342/357.31 |
| 5,760,738 A | 6/1998 | Kawano |
| 5,955,986 A * | 9/1999 | Sullivan .................... 342/357.68 |
| 5,995,040 A * | 11/1999 | Issler et al. ..................... 342/352 |
| 6,020,847 A | 2/2000 | Upton et al. |
| 6,031,489 A | 2/2000 | Wyrwas et al. |
| 6,107,959 A | 8/2000 | Levanon |

(Continued)

FOREIGN PATENT DOCUMENTS

| | | |
|---|---|---|
| EP | 0844492 A1 | 5/1998 |
| EP | 0856957 A2 | 8/1998 |

(Continued)

OTHER PUBLICATIONS

U.S. Appl. No. 13/463,566, filed May 3, 2012; Ian S. Robinson; office action dated Oct. 1, 2014.

(Continued)

*Primary Examiner* — Cassie Galt (57) ABSTRACT

A known ground location (KGL) satellite transceiver can include a position and elevation acquisition module configured to determine a time of flight (TOF) of a pseudonoise (PN) signal and a Doppler shift in a KGL signal for use in determining an orbit of a satellite. The PN signal can include a transmitted PN signal and a transponded PN signal. The KGL signal can include a transmitted KGL signal and a transponded KGL signal. The transmitted PN signal and the transmitted KGL signal can be transmitted sequentially on a first frequency carrier from the KGL satellite transceiver to the satellite. The transponded PN signal and the transponded KGL signal can be retransmitted back sequentially on a second frequency carrier from the satellite to the KGL satellite transceiver. The first frequency carrier and the second frequency carrier use a same frequency carrier or a different frequency carrier from each other.

17 Claims, 6 Drawing Sheets

500

Determining an orbit of a satellite using a time of flight (TOF) of a pseudonoise (PN) signal and a Doppler shift in a known ground location (KGL) signal.  ⌒ 510

(56) References Cited

U.S. PATENT DOCUMENTS

| | | | |
|---|---|---|---|
| 6,147,644 | A | 11/2000 | Castles et al. |
| 6,229,477 | B1 * | 5/2001 | Chang et al. ............. 342/357.21 |
| 6,307,503 | B1 | 10/2001 | Liu |
| 6,476,758 | B1 * | 11/2002 | Chaput et al. ................. 342/118 |
| 6,864,838 | B2 * | 3/2005 | Harles et al. .................. 342/375 |
| 7,372,400 | B2 | 5/2008 | Cohen et al. |
| 7,512,505 | B2 * | 3/2009 | Harles ............................. 702/89 |
| 8,019,541 | B2 | 9/2011 | Cohen et al. |
| 8,451,166 | B2 * | 5/2013 | Gayrard et al. .......... 342/357.31 |
| 8,711,033 | B2 | 4/2014 | Calmettes et al. |
| 2011/0144911 | A1 | 6/2011 | Madhavan et al. |
| 2011/0254730 | A1 | 10/2011 | McBurney |

FOREIGN PATENT DOCUMENTS

| | | |
|---|---|---|
| WO | WO 99/40692 | 8/1999 |
| WO | WO 0052495 | 9/2000 |
| WO | WO 2011/075707 A1 | 6/2011 |

OTHER PUBLICATIONS

U.S. Appl. No. 13/463,566, filed May 3, 2012; Ian S. Robinson; Notice of Allowance mailed Dec. 24, 2014.

PCT/US2013/038503; Filed Apr. 26, 2013; Raytheon Company; international search report dated Nov. 28, 2013.

PCT/US2013/028709; filed Mar. 1, 2013; Raytheon Company; international search report dated Dec. 18, 2013.

Vetter; Fifty Years of Orbit Determination: Development of Modern Astrodynamics Methods; Johns Hopkins Apl Technical Digest; 2007; pp. 239-252; vol. 27, No. 3.

Jayles et al; Ten Centimeters Orbits in Real-Time On-Board of a Satellite: DORIS-DIODE Current Status; Acta Astronautica; 2004; pp. 315-323; vol. 54.

Brunet et al; Doris Precise Orbit Determination and Localization System Description and USO's Performances; 1995 IEEE International Frequency Control Symposium; pp. 122-132.

McCaskill et al; Doppler Only Navigation Using the Timation II Satellite [Unclassified Title], NRL Report 7657; Dec. $3^{rd}$, 1973; 32 pages.

Boehme; Miniature Analog GOS Translator for Trident Reentry Body Accuracy Analysis; Johns Hopkins APL Technical Digest; 2010; pp. 133-140; vol. 29, No. 2.

Levesque et al; Performance Issues Concerning Doppler-Only Localization of Submarine Targets; Saclantcen Report, serial No. SR-325; Jul. 2000; 49 pages.

Lemoine et al; Three Decades of Precision Orbit Determination and its Vital Role to Oceanography; Jun. 19, 2008; 23 pages.

Stewart; Evolution of Military GPS; 21 pages; (the inventor believes that this was publicly available sufficiently earlier than the effective US filing date and any foreign priority date).

U.S. Appl. No. 13/463,566; Ian Robinson; filed May 3, 2012.

Anonymous; Doris; https://noppa.aalto.fi/noppa/kurssi/maa-6.3272/luennot/maa-6_3272_doris.pdf ; Upon information and belief, available prior to May 3, 2012; 4 pages.

U.S. Appl. No. 13/536,809, filed Jun. 28, 2012; Ian S. Robinson; office action dated Oct. 23, 2014.

PCT/US2013/028715; filed Mar. 1, 2013; Raytheon Company; International Search Report dated Jun. 7, 2013.

U.S. Appl. No. 13/536,809, filed Jun. 28, 2012; Ian S. Robinson; Notice of Allowance mailed Feb. 17, 2015.

\* cited by examiner

POSITION AND ELEVATION ACQUISITION FOR ORBIT DETERMINATION

BACKGROUND

Each satellite that orbits the Earth can have a distinct ephemeris. The ephemeris can include various information, such as the position or orbit of the satellite on a number of dates and times in a regular sequence. Some satellites can use their orbit information for various applications. For example, a satellite's orbit information can be used for altimeter and imaging system applications. A satellite in a global positioning system (GPS) can use its orbit information to provide location and time information anywhere on or near the Earth, where a GPS receiver has an unobstructed line of sight to the GPS satellite.

BRIEF DESCRIPTION OF THE DRAWINGS

Features and advantages of the disclosure will be apparent from the detailed description which follows, taken in conjunction with the accompanying drawings, which together illustrate, by way of example, features of the disclosure; and, wherein.

Reference will now be made to the exemplary embodiments illustrated, and specific language will be used herein to describe the same. It will nevertheless be understood that no limitation of the scope of the invention is thereby intended.

DETAILED DESCRIPTION

Before the present invention is disclosed and described, it is to be understood that this invention is not limited to the particular structures, process steps, or materials disclosed herein, but is extended to equivalents thereof as would be recognized by those ordinarily skilled in the relevant arts. It should also be understood that terminology employed herein is used for the purpose of describing particular examples only and is not intended to be limiting. The same reference numerals in different drawings represent the same element. Numbers provided in flow charts and processes are provided for clarity in illustrating steps and operations and do not necessarily indicate a particular order or sequence.

Example Embodiments

An initial overview of technology embodiments is provided below and then specific technology embodiments are described in further detail later. This initial summary is intended to aid readers in understanding the technology more quickly but is not intended to identify key features or essential features of the technology nor is it intended to limit the scope of the claimed subject matter.

Satellites having the right on-board equipment can determine their own orbit by communicating with known or fixed ground locations. The orbit of such satellites can be determined using signals received from the known locations and an on-board processor, including a local oscillator, within the satellite. Such an orbit determination function may use expensive high power and/or mass systems, high grade oscillators that provide a high level of precision (which high grade oscillators can be more costly than standard oscillators with less precision), etc. for accurate and precise orbit determination.

Unlike these more expensive and high mass systems, and unlike the associated methods employed for orbit determination using such satellites, discussed herein is a low cost orbit determination capability for satellites, such as altimeters and imaging systems. The devices, systems and methods discussed herein utilize a ground-based ranging and Doppler-based technique, in which the orbit determination function is carried out at the ground level (or about the ground), rather than at the satellite. As discussed herein, moving the orbit determination function from the satellite to the known locations or fixed locations, such as a known ground location (KGL) on or near the surface of the Earth, can reduce the cost of deploying satellites by deploying satellites without high mass or expensive on-board components while retaining accurate and precise orbit determination as obtained at the KGL.

Figure 1:
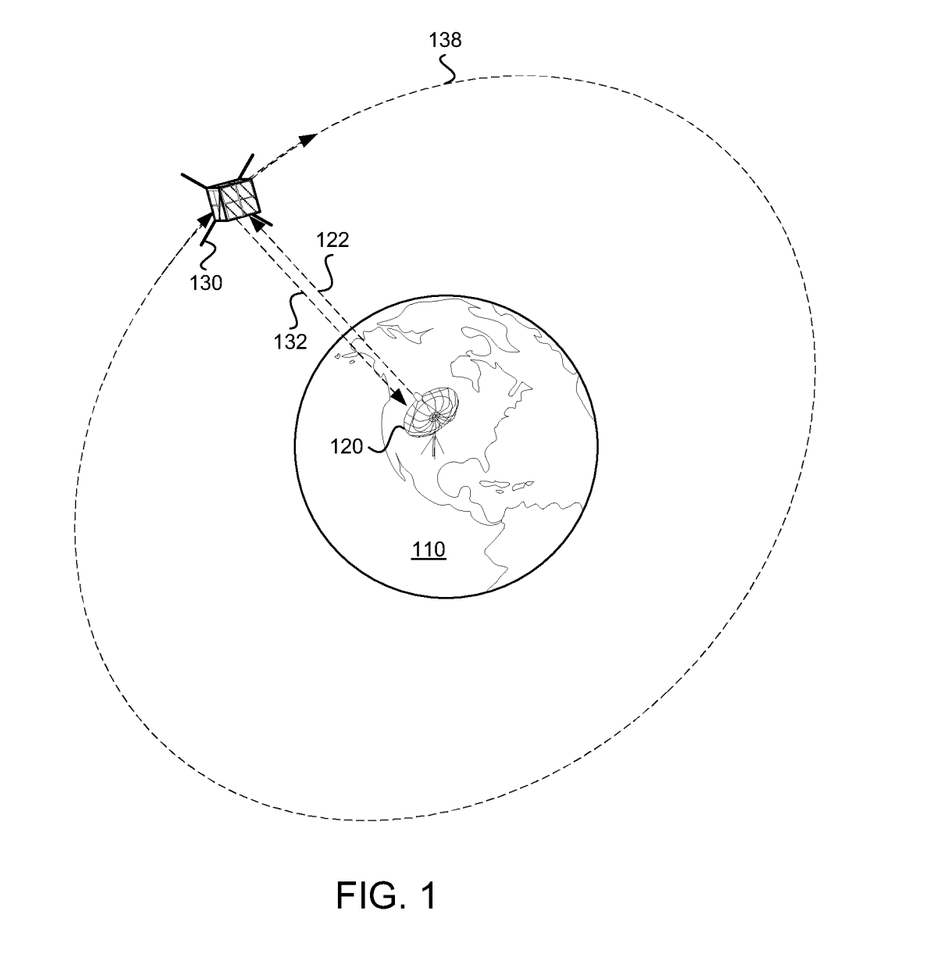
FIG. 1 illustrates a diagram of a known ground location (KGL) satellite transceiver and a satellite in accordance with an example.

FIG. 1 illustrates a transceiver 120 at a known ground location (KGL) that can be used to provide a orbit description (including position and an elevation) of a satellite 130. The transceiver can be referred to as a KGL satellite transceiver. An orbit 138 of the satellite can be determined from the one or more position and the elevation measurements derived at the KGL. The KGL can be located at a known, previously determined location on or near the Earth 110. The transceiver can include a transmitter to transmit signals 122 to a satellite and a receiver to receive signals 132 from the satellite. Signals as used herein can include analog radio frequency (RF) signals. Multiple KGLs, each having one or more transceivers, can form a network of transceivers that can provide multiple satellites with orbit determination (OD) information. In general, the KGL satellite transceiver can transmit signals to a receiver on the satellite. The signals can be copied and/or transponded at the satellite and sent back (or re-broadcasted) to the KGL satellite transceiver.

In one exemplary embodiment, two signals types can be transmitted by the KGL satellite transceiver, one being a pseudonoise (PN) signal and the other being a KGL signal. The PN signal can be generated and transmitted on a specified or predetermined frequency carrier. The PN signal can include a pulsed PN coded signal. The PN signal can also be referred to as a psuedo-random noise (PRN) signal. Information can be encoded in code of the PN signal. A code division multiple access (CDMA) code may be carried by the PN signal to determine range of the satellite to the KGL.

In one aspect, the PN or PRN signal transmitted by the KGL satellite transceiver can have a similar format and/or comprise similar information as a PN or PRN signal transmitted by a GPS satellite, such as time of the PN or PRN signal's origin of transmission. In another aspect, the PN or PRN signal transmitted by the KGL satellite transceiver can have a simplified format and/or comprise similar, but perhaps less, information relative to a PN or PRN signal transmitted by a GPS satellite. For example, unlike a PN or PRN signal transmitted by a GPS satellite, the position of the KGL may not be included in the PN or PRN signal transmitted by the KGL satellite transceiver because the KGL position may be fixed and known at the KGL processing the return PN signal.

Figure 2:
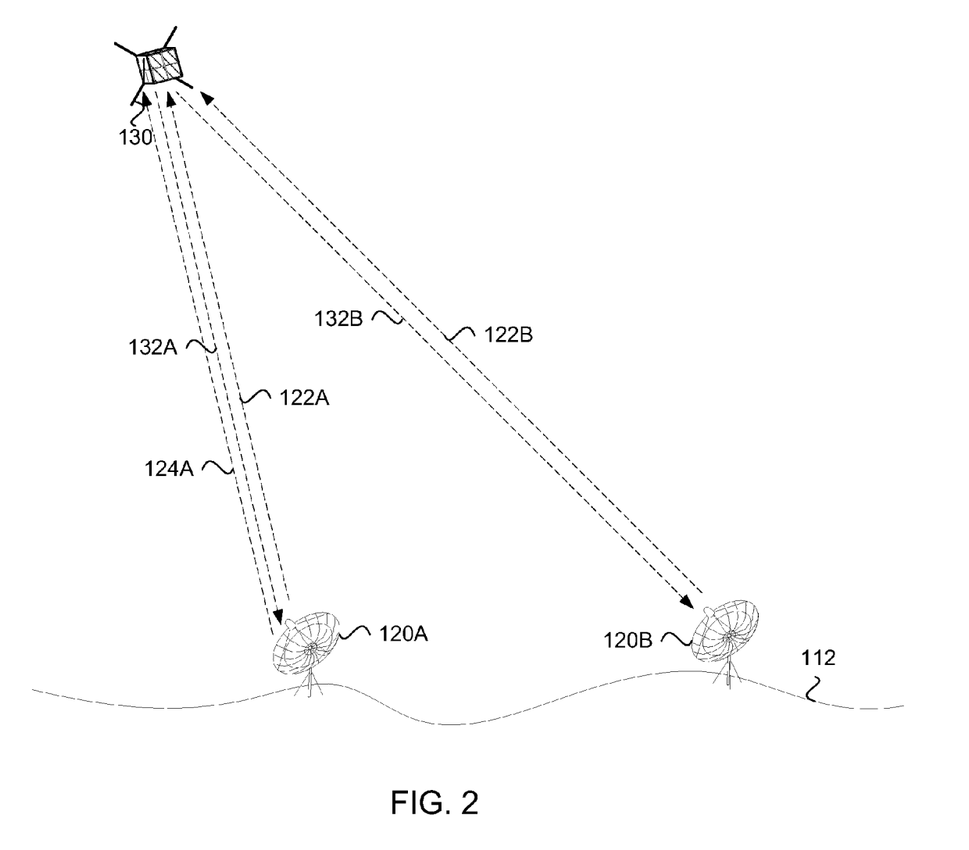
FIG. 2 illustrates a diagram of a plurality of known ground location (KGL) satellite transceivers and a satellite in accordance with an example.

A KGL signal can be generated and transmitted on the same specified or predetermined frequency carrier as the PN signal. The KGL signal, such as a tone (or harmonic), can be used to determine a Doppler shift, which is described below. The tone can be a pulsed sinusoidal wave at specified frequency. The KGL signal can include other signals that can be used to determine the Doppler shift. In an example, the KGL signal can include the PN signal, so a PN can be measured for a range, range-rate, and a Doppler trend. In an example, the PN signal can be used to determine a Doppler shift, in addition to a range and range-rate The PN signal and the KGL signal can be transmitted sequentially by the KGL satellite transceiver 120A on the same specified or predetermined frequency carrier (which can be referred to as a first frequency carrier) to the satellite 130, as illustrated in FIG. 2. The signals from the KGL satellite transceiver can be transmitted in parallel or sequentially. At least one signal can be a PN signal from which range is computed. The Doppler shift can be measured from the PN signal. The KGL signal may also be used. KGL signal can be use to correct the range measurement of the first signal for delays due to the ionosphere. The delay can be unknown but can be estimated if the signals are measured in two different frequencies. Moreover, the signals from the KGL transceiver can be alternated between the PN coded ranging signal and the KGL signal.

The KGL satellite transceiver can be located on or near the surface 112 of the Earth. The PN signal can include a transmitted PN signal and a transponded PN signal. The KGL signal can include a transmitted KGL signal and a transponded KGL signal. A transmitted signal 122A from the KGL satellite transceiver 120A to the satellite can include multiple signal components, such as the transmitted PN signal and the transmitted KGL signal. The KGL satellite transceiver can transmit a PN signals and a second KGL signal (sequentially or in parallel). A satellite can receives, delay, and retransmit the signals. The KGL satellite transceiver computes range from the returned PN signal and Doppler from the carrier of the PN signal. Multiple range and Doppler measurements can be used to estimate ephemeris.

In an example, pulse widths of the transmitted signal 122A and a repetition of the transmitted signal can be set to avoid the KGL satellite transceiver 120A transmitting and receiving at the same time. For example, where the KGL satellite transceiver is transmitting signals to and receiving signals from a low Earth orbit (LEO) satellite, the pulse width of the transmitted signal can be, for example, 1 millisecond (msec) on with 2 msecs off. Of course, this is not meant to be limiting in any way. The pulse widths and repetition can allow for the time of flight (TOF) of the PN signal and the KGL signal from the KGL satellite transceiver to the satellite and back to the KGL satellite transceiver without interference or reduced interference from the KGL satellite transceiver or the satellite.

A satellite signal transceiver, a satellite signal receiver, or a receiver on-board (ROB) the satellite 130 can receive the transmitted PN signal component of the PN signal. A signal transceiver, signal receiver, or ROB the satellite can receive the transmitted KGL signal of the KGL signal. The satellite can delay the PN signal and the KGL signal and re-broadcast or transpond the PN signal and the KGL signal back to the KGL satellite transceiver 120A on a second frequency carrier, where the first frequency carrier and the second frequency carrier operate on a same common frequency carrier. The delay can be a specified delay known at the KGL, which can be used in the TOF calculation of the range from the PN signal. A transponded signal 132A from the satellite to the KGL satellite transceiver can include the transponded PN signal and the transponded KGL signal. The transponded signal 132A can be transponded or transmitted from the satellite signal transceiver, a satellite signal transmitter, or the ROB the satellite. The PN signal and the KGL signal can be transponded sequentially by the satellite to the KGL satellite transceiver.

Figure 3A:
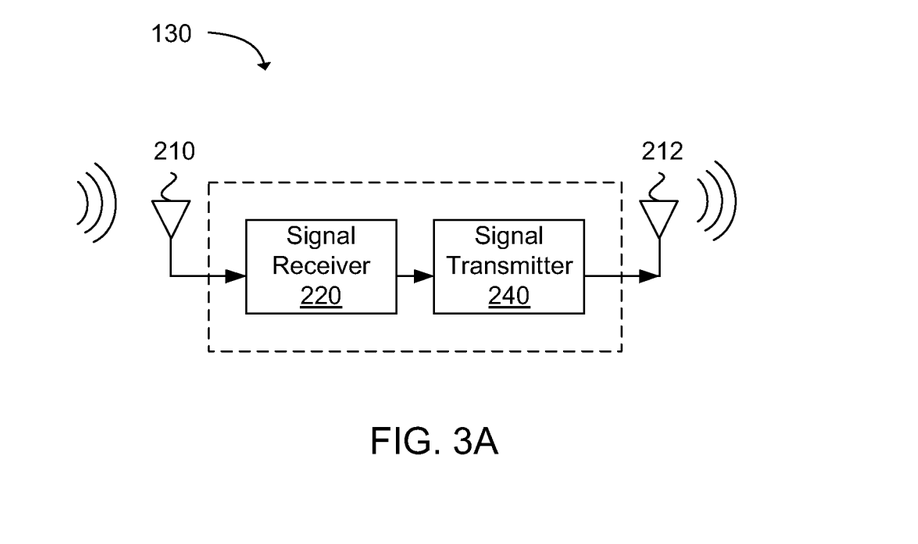
FIG. 3A illustrates a block diagram of a satellite with a signal receiver and signal transmitter in accordance with an example.

FIG. 3A illustrates a partial schematic of a satellite 130 having at least one receiving antenna 210, a signal receiver 220, at least one transmitting antenna 212, and/or a signal transmitter 240. The at least one receiving antenna and the signal receiver of the satellite can receive the sequential transmission of the transmitted PN signal and the transmitted KGL signal of the transmitted signal from the KGL satellite transceiver. The signal transmitter of the satellite can generate the transponded signal from the transmitted signal provided by the signal receiver of the satellite. The signal transmitter and at least one transmitting antenna of the satellite can transmit the sequential transmission of the transponded PN signal and the transponded KGL signal of the transponded signal back to the KGL satellite transceiver.

Figure 3B:
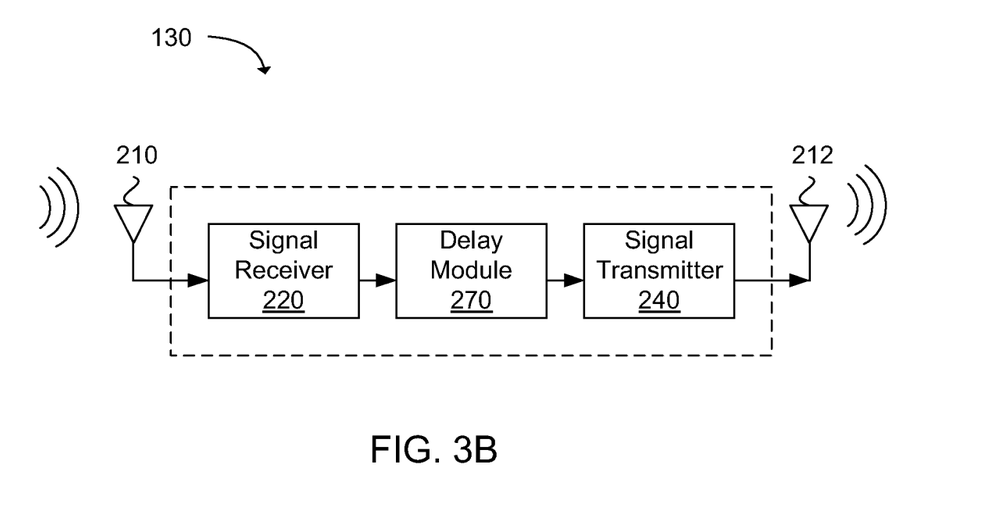
FIG. 3B illustrates a block diagram of a satellite with a signal receiver, signal transmitter, and a delay module in accordance with an example.

FIG. 3B illustrates a partial schematic of a satellite 130 with a delay module 270 between the signal receiver 220 and the signal transmitter 240 of the satellite 130. When the first frequency carrier and the second frequency carrier, such as those discussed above, operate on the same common frequency carrier, the delay module can add a known delay between the reception of the transmitted signal from the KGL satellite transceiver, and the transmission of the transponded signal from the satellite, so the transmitted signal (from the KGL satellite transceiver) and the transponded signal (from the satellite) do not interfere with each other. The delay module can allow for time-division duplexing (TDD). TDD is an application of time-division multiplexing (TDM) to separate transmission signals and received signals. At the KGL satellite transceiver, the transmission signals can include the transmitted signals from the KGL satellite transceiver, and the received signals can include the transponded signals from the satellite. At the satellite, the received signals can include the transmitted signals from the KGL satellite transceiver, and the transmission signals can include the transponded signals from the satellite. In TDD, the transmission signals and the received signals (the transmitted signals and the transponded signals) may be carried on the same frequency carrier (or carrier frequency) where the transmission signals use a different time interval from the received signals, so the transmission signals and the received signals do not generate interference for each other. TDM is a type of digital multiplexing in which two or more bit streams or signals, such as transmission signals and received signals, are transferred sequentially as sub-channels in one communication channel, and physically taking turns on the channel. In frequency-division duplexing (FDD), discussed below, a transmitter and a receiver operate using different frequency carriers (or carrier frequencies). In FDD, interference can be avoided because the transmission signals use a different carrier frequency from the received signals.

Referring back to FIG. 2, the KGL satellite transceiver 120A can receive the transponded signal 132A, including the transponded PN signal and the transponded KGL signal. The KGL satellite transceiver can further comprise, or otherwise be associated with, a position and elevation acquisition module (see FIG. 4), which can measure the returned signals (e.g., the transponded PN signal and the transponded KGL signal) and can estimate the orbit of the satellite 130. The PN signal can be decoded by the KGL satellite transceiver. From the decoded PN signal, the roundtrip time of flight (TOF) of a PN signal can be measured and converted to a range.

The precision of the range can vary with chip rate. A higher chip rate can improve the precision of the range. In an example, range can be measured to about 1% of distance traveled by light in chip time, however, the ultimate orbit estimation quality may depend on the precision of each measurement and the number of measurements. The chip rate of a code, such as a CDMA code embedded in the PN signal, can be the number of pulses per second (chips per second) at which the code is transmitted (or received). Precision of the range can also be affected by clock errors. Clock errors can be cancelled using the same KGL satellite transceiver with a common clock at the KGL. Indeed, the satellite avoids any timing electronics, oscillators, or GPS-related components. The electronics at the KGL satellite transceiver can be of moderate quality and stability as any clock errors are made common, thus having no impact on the orbit determination.

In one exemplary embodiment, the KGL satellite transceiver can measure the Doppler shift in the KGL signal, as discussed in greater detail below. The Doppler shift of the KGL signal may be trended to provide information on satellite position in directions other than the radial direction. The PN signal can measure distance in the radial direction only, at a given time. Since the satellite is merely downlinking the uplinked signal on the same carrier as the uplink, the KGL satellite transceiver can compare the returned signal with the original to determine Doppler shift.

In another exemplary embodiment, the KGL satellite transceiver can measure the Doppler shift in the PN signal, and the Doppler shift of the PN signal may be trended to provide inputs to ephemeris estimation.

The KGL satellite transceiver can transmit orbit information (or orbit determination information) of the satellite to the satellite as generated by the position and elevation acquisition module of the KGL satellite transceiver. Determining the orbit of the satellite from or at the KGL satellite transceiver, instead of determining the orbit of the satellite at the satellite, can reduce the cost of the satellite because an on-board local oscillator (LO), or clock, may not be needed, generally, or may not be needed for orbit determination.

In another exemplary embodiment illustrated by FIG. 2, a second KGL satellite transceiver 120B at a different KGL can communicate with the satellite 130. Although FIG. 2 shows the second KGL satellite transceiver transmitting and receiving and the first KGL satellite transceiver 120A transmitting and receiving in the same figure for illustrative purposes, the first KGL satellite transceiver and second KGL satellite transceiver may communicate with the satellite at different times, such as sequentially at different points in the satellite's orbit. The second KGL satellite transceiver can transmit transmitted signals 122B to the satellite and receive transponded signals 132B back from the satellite. A single satellite may receive transmitted signals from multiple KGL satellite transceivers at different KGLs and transmit transponded signals back to these multiple KGL satellite transceivers. Similarly, a single KGL satellite transceiver may transmit transmitted signals to multiple satellites and receive and process transponded signals from multiple KGL satellite transceivers (not shown). The first KGL satellite transceiver 120A can operate independently of the second KGL satellite transceiver 120B. In addition, in one aspect, the first KGL satellite transceiver and the second KGL satellite transceiver can be in communication with each other via an optical fiber, wired, or wireless connection or link. In another aspect, the first KGL satellite transceiver and the second KGL satellite transceiver can be in communication with each other via a control station.

In another exemplary embodiment, a second set of signals can be transmitted by the KGL satellite transceiver and received by the KGL satellite transceiver to at least partially compensate for various factors, occurrences, etc., such as atmospheric delays and refraction in the transmitted signals and in the transponded signals.

Atmospheric delays can include ionospheric delays and tropospheric delays. Ionospheric delay occurs in the ionosphere, which is a part of the upper atmosphere, comprising portions of the mesosphere, thermosphere and exosphere, distinguished because the upper atmosphere can be ionized by solar radiation. The ionosphere can play a part in atmospheric electricity and forms the inner edge of the magnetosphere and can influence radio propagation to distant places on the Earth.

Tropospheric delay occurs in the troposphere, which includes the lowest portion of the Earth's atmosphere. The troposphere contains approximately 80% of the atmosphere's mass and 99% of its water vapor and aerosols. The average depth of the troposphere can be approximately 11 kilometers (km) Troposphere depth can vary, being deeper in the tropical regions, up to 20 km (12 miles), and shallower near the poles, at 7 km (4.3 mi) depending upon the time of year.

Refraction can be the change in direction of a wave due to a change in the index of refraction of the medium through which the signal passes. Although atmospheric refraction may not be measured, the second set of signals can be used to estimate for atmospheric refraction and account for the estimate in final range estimates. Atmospheric refraction can include the deviation of light or other electromagnetic wave, such as a RF signal, from a straight line as the light or other electromagnetic wave passes through the atmosphere. Refraction can occur due to the variation in air density as a function of altitude. Refraction can cause an extra path to be introduced into flight and can generate a small error in range measurements.

In essence, atmospheric delays and refraction can vary the TOF and the Doppler shift of signals, which variances can be accounted or compensated for by the second set of signals. If the satellite or the KGL satellite transceiver is in the ionosphere then Doppler may be affected. A KGL on the ground is not in the ionosphere, but the ionosphere can extends up to about 1000 km, so satellites can be in the ionosphere.

The second set of signals can include a second PN signal and a second KGL signal. The second PN signal and the second KGL signal can have similar characteristics to what may be termed here as the first PN signal and the first KGL signal previously described, but can operate on a different frequency carrier from the first PN signal and the first KGL signal. The second PN signal can include a second transmitted PN signal and a second transponded PN signal. The second KGL signal can include a second transmitted KGL signal and a second transponded KGL signal. A second transmitted signal from the KGL satellite transceiver to the satellite can include the second transmitted PN signal and the second transmitted KGL signal. A second transponded signal from the satellite to the KGL satellite transceiver can include the second transponded PN signal and the second transponded KGL signal.

The second transmitted signal can be transmitted on a third frequency carrier, and the second transponded signal can be transmitted on a fourth frequency carrier. The first frequency carrier (discussed above) and the third frequency carrier can be a different frequency carrier from each other. The second frequency carrier (discussed above) and the fourth frequency carrier can be a different frequency carrier from each other. A first set of signals, including the first PN signal and the first KGL signal, and the second set of signals can operate using at least two frequency carriers. Dual frequencies of the first set of signals and second set of signals can compensate for atmospheric delays and refraction. The second PN signal and the second KGL signal can be transmitted sequentially. In an example, the transmitted signal can include the second transmitted signal, and the transponded signal can include the second transponded signal.

Figure 3C:
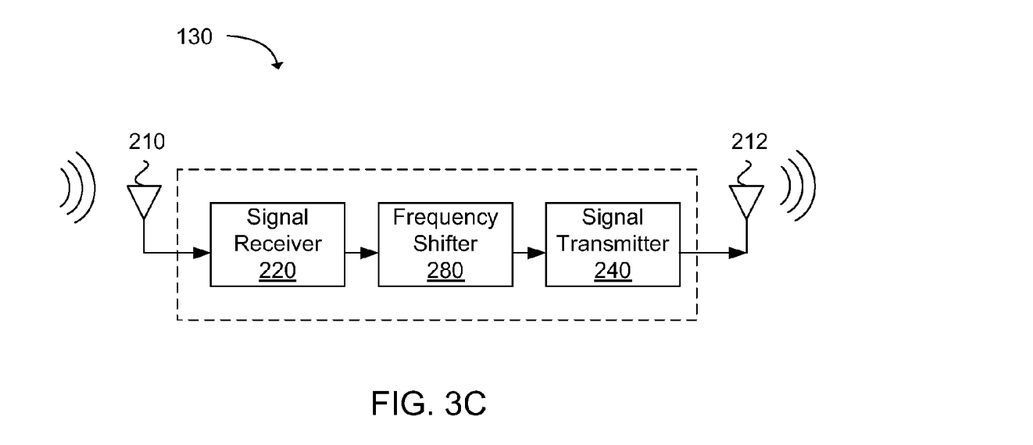
FIG. 3C illustrates a block diagram of a satellite with a signal receiver, signal transmitter, and a frequency shifter in accordance with an example.

In another exemplary embodiment, the KGL satellite transceiver 120A can transmit the transmitted signal 122A to the satellite 130 on the first frequency carrier, as previously described above in reference to FIGS. 1-2. However, in this embodiment the satellite may be configured as illustrated in FIG. 3C, which satellite 130 can include a frequency shifter 280 between the signal receiver 220 and the signal transmitter 240. When the first frequency carrier and the second frequency carrier operate on a different frequency carrier from each other, the frequency shifter can shift the frequency of the transponded signal to the second frequency carrier after the satellite receives the transmitted signal on the first frequency carrier. The frequency shifter provides that the transmitted signal and the transponded signal do not interfere with each other. The frequency shifter can allow for FDD. The frequency shifter can include a local oscillator. The transmitted signal can be mixed with the local oscillator to generate the transponded signal on the second frequency carrier. The satellite may also transmit a tone at the frequency of the local oscillator or at a harmonic based on the satellite's local oscillator. The KGL satellite transceiver can receive the tone and can calibrate the frequency of the local oscillator.

The KGL satellite transceiver 120A can receive the transponded signal 132A from the satellite 130 on the second frequency carrier and decode and measure the transponded signals, as previously described with FIGS. 1-2. Additionally, the KGL satellite transceiver can calibrate drift in the local oscillator using the selected transmissions. As indicated above, the KGL satellite transceiver can transmit orbit information (or orbit determination information) of the satellite to the satellite from the KGL. The calibration of drift can be useful for Doppler measurements on the second frequency carrier. The second set of signals can be transmitted by the KGL satellite transceiver and received by the KGL satellite transceiver for both the TDD and the FDD examples to compensate for atmospheric delays and refraction in the transmitted signals and the transponded signals.

Figure 3D:
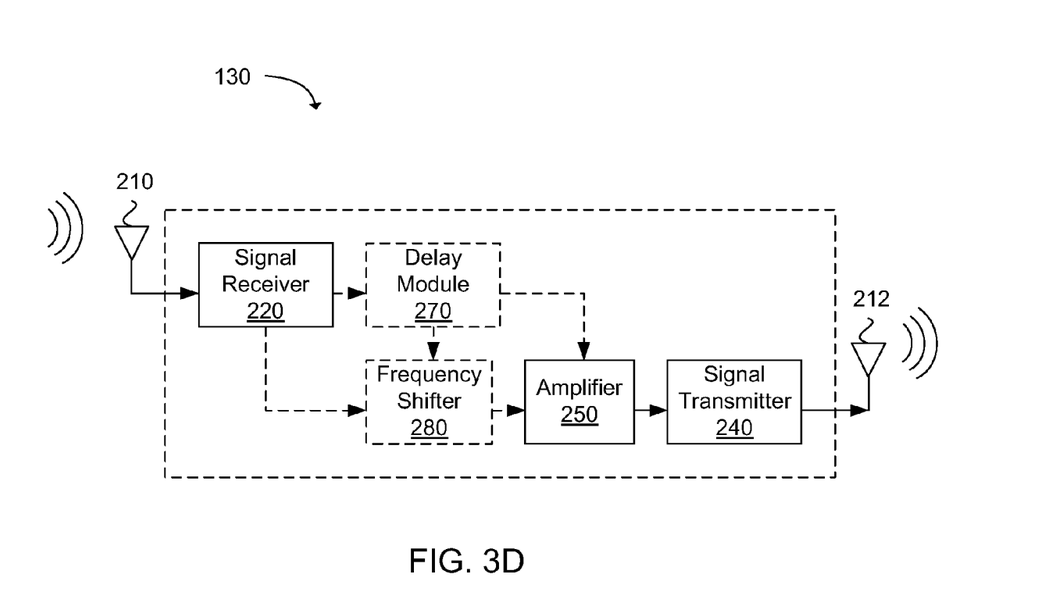
FIG. 3D illustrates a block diagram of a satellite with a signal receiver, signal transmitter, a delay module, a frequency shifter, and an amplifier in accordance with an example.

FIG. 3D illustrates another exemplary configuration of a satellite 130 with an amplifier 270 operable with a signal receiver 220 and a signal transmitter 240 for amplifying the transponded signals. The amplifier can be used with a delay module 270 and/or a frequency shifter 280 (these being similar in function as those previously described). In another example, the delay module can be used in a TDD configuration. In another example, the frequency shifter can be used in a FDD configuration. The satellite may switch between the TDD configuration and the FDD configuration.

The exemplary satellite configurations illustrated in FIGS. 1-3D, which are not intended to be limiting, can facilitate a low cost, a low weight, and/or a low power solution for orbit determination. Moreover, the exemplary satellites and the KGL satellite transceivers discussed herein can provide high precision orbit determination capability similar to a much more complex system of satellites using on-board receivers and laser ranging. For instance, an exemplary satellite configured as discussed herein is not subject to errors associated with an on-board local oscillator.

Figure 4:
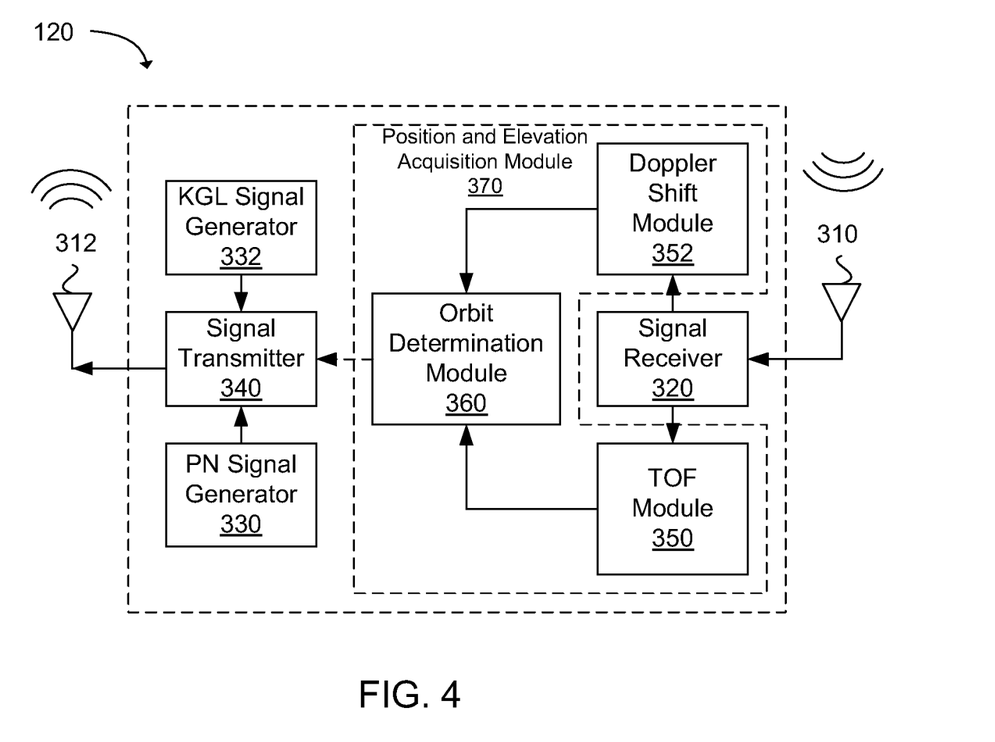
FIG. 4 illustrates a block diagram of a known ground location (KGL) satellite transceiver for orbit determination of a satellite in accordance with an example.

FIG. 4 illustrates an exemplary KGL satellite transceiver 120 used for orbit determination of a satellite. The KGL satellite transceiver can include a PN signal generator 330, a KGL signal generator 332, a signal transmitter 340, and at least one transmitting antenna 312 on a transmission side. The KGL satellite transceiver can further include at least one receiving antenna 310, a signal receiver 320, a TOF module 350, a Doppler shift module 352, and an orbit determination module 360 on a reception side. The signal receiver and the signal transmitter may use a common transceiver and a common antenna. The functions and modules of the KGL satellite transceiver may be performed by multiple devices or a single integrated device.

The KGL satellite transceiver can include a position and elevation acquisition module 370, which can further include the TOF module 350, the Doppler shift module 352, and the orbit determination module 360. The position and elevation acquisition module of the KGL satellite transceiver can determine the TOF of the PN signal and a Doppler shift in a KGL signal to determine the orbit of the satellite. Position and elevation acquisition for orbit determination is provided by the KGL satellite transceiver and the position and elevation acquisition module.

The PN signal generator can generate a PN code for the transmitted PN signal. The PN signal generator can include an atomic clock or a precise oscillator to encode the PN signal with a time and/or generate a frequency carrier.

The KGL signal generator can generate the transmitted KGL signal. The signal transmitter can sequentially order the transmitted PN signal with the transmitted KGL signal into the transmitted signal, which is to be transmitted to the satellite via the at least one transmitting antenna. The signal transmitter may transmit high chip rate PN signals. Moreover, in a TDD configuration, the signal transmitter can periodically space the transmission of the transmitted signal to avoid interference with the transponded signal.

At the reception side, the transponded signal, including the transponded PN signal and transponded KGL signal, can be received by the signal receiver 320 via the at least one receiving antenna. In the TDD configuration, the transponded signal can be received on the first frequency carrier. In a FDD configuration, the transponded signal can be received on the second frequency carrier.

The Doppler shift module 352 can measure a two-way Doppler shift of each KGL transponded signal. For example, the Doppler shift module can measure a roundtrip Doppler shift in the KGL signal from the KGL satellite transceiver to the satellite and back to the KGL satellite transceiver. A plurality of KGL transponded signals received can be trended to generate a Doppler trend. In the event a second set of signals are used, the second KGL transponded signal (or plurality of second KGL transponded signals) can be compared to what may be termed as the first KGL transponded signal (or plurality of first KGL transponded signals) to compensate and correct for unknown refraction and atmospheric delays, such as ionospheric or other similar delays. A corrected Doppler trend can be used to fit orbital parameters. The Doppler trend may provide the velocity and the direction of the satellite, which information can be used in orbit determination. In another example, the Doppler shift module can measure a two-way Doppler shift of each PN transponded signal.

The TOF module 350 can decode and measure a time of flight (TOF) of the transponded PN signal. For example, the TOF module can measure a roundtrip TOF of the PN signal from the KGL satellite transceiver to the satellite and back to the KGL satellite transceiver. In the event a second set of signals are used, the TOF module can decode and measure the TOF of the second transponded PN signal. The TOF of the transponded PN signal and/or the second transponded PN signal can be converted to a range (or range measurement) and range-rate. When the second set of signals are used, the second transponded PN signal (or plurality of second transponded PN signals) can be compared to what may be termed the first transponded PN signal (or plurality of first PN transponded signals) to compensate and correct for unknown refraction and atmospheric delays. A corrected range and/or range rates can be used to fit orbital parameters.

The orbit determination module 360 can combine the Doppler trend, the range, and/or the range rates for an orbit determination. The orbit determination information may include a position, an elevation, a velocity, and/or a direction of the satellite.

The orbit determination module may transmit the orbit determination information of the satellite to the satellite or a control station via the signal transmitter 340 and the at least one transmitting antenna 312. The orbit determination module may also transmit the orbit determination information of the satellite to the control station via an optical or wired connection or link.

The orbit determination module 360 may include a Kalman filter. Using measurements observed over time containing noise, random variations, and other inaccuracies, the Kalman filter can generate values that tend to be closer to the true values of the measurements and their associated calculated values. The Kalman filter can produce estimates of the true values of measurements and their associated calculated values by predicting a value, estimating the uncertainty of the predicted value, and computing a weighted average of the predicted value and the measured value. The most weight can be given to the value with the least uncertainty. The estimates produced by the Kalman filter tend to be closer to the true values than the original measurements because the weighted average has a better estimated uncertainty than either of the values that went into the weighted average. Other modules and methods may also be used in estimating orbits.

The transmitting antenna 312 and/or receiving antenna 310 of the satellite can be a wide angle antenna to cover the Earth from a low orbit. The antenna gain can be limited with a wide angle antenna. The receiving antenna of the satellite and the transmitting antenna can be a single antenna or a duplex antenna as long as the antenna can both receive the transmitted signal(s) and transmit the transponded signal(s).

The transmitted signal(s) and transponded signal(s) can operate in a frequency band (the PN and KGL frequency band) between a very high frequency (VHF) band to a K-under ($K_u$) band. The VHF band is the radio frequency range from 30 megahertz (MHz) to 300 MHz, and the $K_u$ band is the radio frequency range from 10.95 gigahertz (GHZ) to 14.5 GHz, or the band directly below the K-band. The K-band is the radio frequency range from 18 GHz to 27 GHz. The PN and KGL frequency band can include the VHF, an ultra high frequency (UHF), and portions of a super high frequency (SHF) band, such as the $K_u$ band.

In an example, the satellite can include minimal processing to maintain orbit information and/or predict an orbit during a time interval when the satellite moves out of the range of one KGL satellite transceiver until the satellite is updated with orbit determination information from a different KGL satellite transceiver that is in range. Moreover, the KGL satellite transceiver may be relocatable, meaning the at the KGL satellite transceiver may be relocated to a different KGL. If necessary, the entire system can also be reconstituted rapidly at another location. The satellite does not need to know the location of the KGL (even if relocated or a different KGL used) as the KGL comprises known ground location information. As relocated, the KGL can perform the same functions as described herein to facilitate orbit determination.

Providing orbit determination at a ground location, such as at the KGL, instead of the satellite can reduce the cost of manufacturing and deploying satellites with functionality to obtain their orbit information. Generating orbit determination from the TOF and Doppler shift of signals at the KGL rather than at the satellite, can provide a small, low cost precision orbital determination (POD) capability for satellites, such as remote sensing satellites, including altimeters and imaging systems. The orbit determination function generated at the ground location, can be used in an operationally responsive space system, where rapid deployment of satellites can be achieved, which may be rapidly reconstituted if necessary.

The precision orbit determination function as discussed herein that is generated at the ground location can have benefits over in-space orbital determination systems utilizing on-board processing of Doppler and/or GPS signals with onboard algorithms. For instance, a satellite using in-space orbital determination generated by the satellite often utilizes a precise oscillator, an ultrastable oscillator, or an atomic clock, which can be more expensive than a satellite with no local oscillator or a standard local oscillator. In addition, a satellite using in-space orbital determination generated by the satellite often utilizes an on-board local oscillator which can generate errors in measurements. Even more, in-space orbital determination generated by a satellite may not be low cost and/or can be susceptible to errors in the on-board local oscillator.

It is further noted that the precision orbit determination capability discussed herein that is generated at the ground location using TOF and Doppler shift can have benefits over ground based techniques using laser transmitters plus space-based retro-reflectors, as laser can be expensive and use more power to operate. The current precision orbit determination function generated at the ground location using TOF and Doppler shift can improve performance and accuracy over Doppler-only or TOF-only methods, and with much greater simplicity than laser ranging. For example, clock errors in the transmission of the transmitted PN signal and reception of the transponded PN signal back to the KGL satellite transceiver may be common, thus having little impact in the accuracy of the measurements, such as the range, range-rate, and Doppler trend. The Doppler trend plus ranging can provide orbital determination accuracy of less than one meter.

The precision orbit determination function generated at the ground location using TOF and Doppler shift can predict ephemeris with reliable and high quality measurements, such as position and velocity, at low cost. Indeed, the combined range (from the time of flight of the PN signal) and the Doppler measurements can be used to constrain orbit ephemeris filters. This is beneficial in a number of ways as power and/or size specifications used for on-board systems of satellites with orbit determination function may not be workable for small satellites.

Although not to be limiting in any way, in some exemplary embodiments the satellite 130 illustrated in FIGS. 1-3D can be a CUBESAT or other similar type of small or inexpensive type satellite, such as a picosatellite or a nanosatellite. The CUBESAT can be a type of miniaturized satellite that can have a volume of approximately a liter (10 centimeter (cm) cube) with a weight less than 2 kilograms (kg). The CUBESAT can use commercial off-the-shelf electronics components. The picosatellite (or picosat) can refer to an artificial satellite with a wet mass between 0.1 and 1 kg (0.22 and 2.2 lb). The nanosatellite (or nanosat) can refer to an artificial satellite with a wet mass between 1 and 10 kilograms (kg) (2.2 and 22 pounds (lb)). A microsatellite (or microsat) can refer to an artificial satellite with a wet mass between 10 and 100 kg (22 and 220 lb). These satellites can include various components capable of providing various functions, such a power source or a power generation mechanism, a mechanism to control heating and cooling of the satellite, and/or a mechanism to point a transmitter or antenna to the Earth. The power generation mechanism can include solar cells or panels. The power source can include a battery or capacitive device. The mechanism to control the heating and cooling of the satellite may control the heating and cooling of the satellite passively, so the mechanism does not require a power source to function properly. The mechanism to point the transmitter or antenna to the Earth may steer or rotate the position of the satellite passively. Those skilled in the art will recognize that these several descriptions are merely exemplary, and are not intended to be limiting in any way.

The position and elevation acquisition module of the KGL satellite transceiver can provide Doppler-based orbit determination and can reduce errors otherwise associated with a local or on-board oscillator on the satellite. An ultra-stable oscillator or clock, such as an atomic clock, may be included in the KGL satellite transceiver or available to the KGL satellite transceiver on the ground. The satellite may not include an ultra-stable oscillator.

In an example, the satellite (shown in FIGS. 1-3D) can have a reduced cost and/or reduced size of space components. The satellite can use a delayed repeater for Doppler signals. The satellite can use a low cost local oscillator or transponder for ranging signals. The satellite can avoid using GPS and/or a stable clock on the satellite. Orbit determination can be provided by the KGL satellite transceiver on the ground. A greater percentage of a power/link budget (e.g., power and aperture) for the orbit determination can be placed on the ground, where power is cheaper and more readily available. The number of frequency carriers used in the orbit determination can be low due to reuse of the frequencies for alternately transmitting the PN ranging signal (the PN signal) and the Doppler signal (the KGL signal). Orbital determination may be provided to the satellite in real time for tasking and collection, and may be used to geo-locate collected data. In an example, orbital determination accuracy can be determined by a range error, which can be determined by a chip rate. For instance, a range generated by the KGL satellite transceiver can have less than one meter radial error. Doppler measurements can provide additional accuracy to the range. The Doppler measurements can also generate sub meter/second velocity information.

The satellite illustrated in FIGS. 1-3D can be a low Earth orbit (LEO) satellite. LEO can generally be defined as an orbit within the locus extending from the Earth's surface 110 up to an altitude of approximately 2,000 kilometers (km). Other types of satellites are medium Earth orbit (MEO) satellites. MEO, also known as an intermediate circular orbit (ICO), can be a region of space around the Earth above the LEO (altitude of approximately 2,000 km or 1,243 miles (mi)) and below geostationary orbit (altitude of 35,786 km or 22,236 mi). The geostationary orbit, also known as the geostationary Earth orbit (GEO), can have a period equal to the Earth's rotational period and an orbital eccentricity of approximately zero. An object in the GEO can appear motionless, at a fixed position in the sky, relative to ground observers. Using the satellite in LEO instead of MEO can reduce the power consumed to receive the transmitted signals and transmit the transponded signals because the LEO can be closer to the KGL satellite transceiver. The satellite can have a much lower cost, simpler design, and fewer components than a satellite with on-board orbit determination components (which may include atomic clock). Given the close range of the satellite in LEO to the KGL satellite transceiver, the signal strength for the transponded signals can be less than 10 watts (W), in an example. Furthermore, the satellite can be a satellite with a stable orbit. A GEO satellite may be used if the GEO satellite has line of sight to at least three KGL satellite transceivers.

A GEO satellite can have a velocity of approximately 3 km/second (sec) to match the velocity of the Earth with an apparent velocity of approximately 0 km/sec. The apparent velocity can be an object's velocity, such as a satellite, relative to another object, such as the KGL satellite transceiver at a fixed point on the Earth. The satellite in the LEO (or other LEO satellite) can have an orbit with an apparent velocity of approximately 5 to 7.5 km/sec relative to the fixed point on the Earth.

A Doppler shift can be a change in a frequency (or a change in a wavelength) of a wave for an observer, such as a receiver, moving relative to the source of the wave, such as a transmitter on a satellite. The motion of the observer, the source, or both can generate a change of the frequency. The relative changes in frequency due to the Doppler effect can be explained as follows. When the source of the waves is moving toward the observer, each successive wave crest is emitted from a position closer to the observer than the previous wave. Therefore, each wave takes slightly less time to reach the observer than the previous wave. Thus, the time between the arrival of successive wave crests at the observer is reduced, causing an increase in the frequency. While the waves are traveling, the distance between successive wave fronts is reduced, so the waves "bunch together". Conversely, if the source of waves is moving away from the observer, each wave is emitted from a position farther from the observer than the previous wave, so the arrival time between successive waves is increased, reducing the frequency. The distance between successive wave fronts is increased, so the waves "spread out".

The Doppler shift can be proportional to the carrier frequency. Higher frequencies can provide more accuracy in Doppler measurements than lower frequencies but generating higher frequencies can consume more power in the satellite than lower frequencies. Objects moving at greater velocities relative to each other can provide more accuracy in Doppler measurements than objects moving at slower velocities relative to each other. Objects at closer distances to each other can provide more accuracy in Doppler measurements than objects at farther distances to each other. The satellite operating in LEO can impose a greater amount of Doppler shift on the transmitted signal and the transponded signal than a satellite operating in MEO, which can have a slower apparent velocity.

Each signal received by the satellite and transmitted by the satellite can experience a Doppler shift in frequency due to the relative motion between the satellite and the KGL satellite transceiver. Thus, each signal, such as the transmitted signal and the transponded signal can experience a different Doppler shift from each other.

Figure 5:
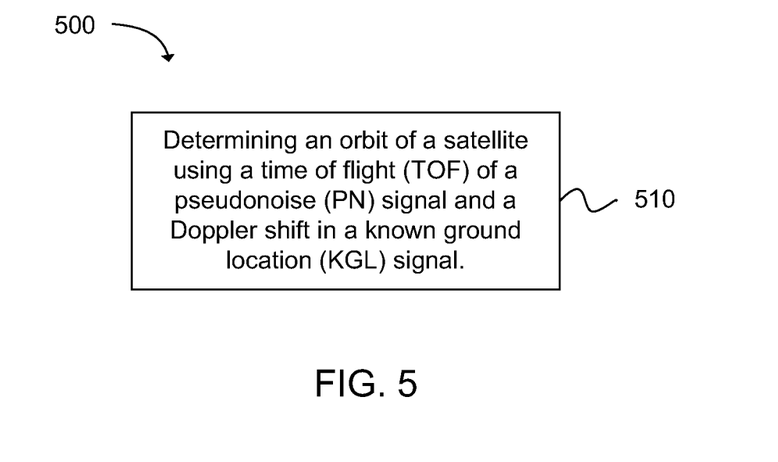
FIG. 5 depicts a flow chart of a method for orbit determination of a satellite in accordance with an example.

Another example provides a method 500 for orbit determination of a satellite, as shown in the flow chart in FIG. 5. The method includes the operation of determining an orbit of a satellite using a time of flight (TOF) of a pseudonoise (PN) signal and a Doppler shift in a known ground location (KGL) signal, as in block 510.

The PN signal can include a transmitted PN signal and a transponded PN signal. The KGL signal can include a transmitted KGL signal and a transponded KGL signal. The transmitted PN signal and the transmitted KGL signal can be transmitted sequentially on a first frequency carrier from the KGL satellite transceiver to the satellite. The transponded PN signal and the transponded KGL signal can be retransmitted back sequentially on a second frequency carrier from the satellite to the KGL satellite transceiver. The first frequency carrier and the second frequency carrier use a same frequency carrier or a different frequency carrier from each other.

Various techniques, or certain aspects or portions thereof, may take the form of program code (i.e., instructions) embodied in tangible media, such as floppy diskettes, CD-ROMs, hard drives, non-transitory computer readable storage medium, or any other machine-readable storage medium wherein, when the program code is loaded into and executed by a machine, such as a computer, the machine becomes an apparatus for practicing the various techniques. In the case of program code execution on programmable computers, the computing device may include a processor, a storage medium readable by the processor (including volatile and non-volatile memory and/or storage elements), at least one input device, and at least one output device. The volatile and non-volatile memory and/or storage elements may be a RAM, EPROM, flash drive, optical drive, magnetic hard drive, or other medium for storing electronic data. The KGL satellite transceiver and satellite may also include a transceiver module, a counter module, a processing module, and/or a clock module or timer module. One or more programs that may implement or utilize the various techniques described herein may use an application programming interface (API), reusable controls, and the like. Such programs may be implemented in a high level procedural or object oriented programming language to communicate with a computer system. However, the program(s) may be implemented in assembly or machine language, if desired. In any case, the language may be a compiled or interpreted language, and combined with hardware implementations.

It should be understood that many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions, which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. The modules may be passive or active, including agents operable to perform desired functions.

Reference throughout this specification to "an example" or "exemplary" means that a particular feature, structure, or characteristic described in connection with the example is included in at least one embodiment of the present invention. Thus, appearances of the phrases "in an example" or the word "exemplary" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as defacto equivalents of one another, but are to be considered as separate and autonomous representations of the present invention.

Furthermore, the described features, structures, or characteristics may be combined in any suitable manner in one or more embodiments. In the following description, numerous specific details are provided, such as examples of layouts, distances, network examples, etc., to provide a thorough understanding of embodiments of the invention. One skilled in the relevant art will recognize, however, that the invention can be practiced without one or more of the specific details, or with other methods, components, layouts, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

What is claimed is:

1. A known ground location (KGL) satellite transceiver for determining an orbit of a satellite, the KGL satellite transceiver comprising:

a transmitter operable to transmit a pair of signals to the satellite, the pair of signals including a pseudonoise (PN) signal and a KGL signal, the pair of signals being transmitted sequentially on a first frequency carrier, wherein the satellite is operable to transpond the pair of signals on a second frequency carrier;

a receiver operable to receive a pair of transponded signals from the satellite on the second frequency carrier, the pair of transponded signals including a transponded PN signal and a transponded KGL signal;
a processor; and
a memory device including a data store to store a plurality of data and instructions that, when executed by the processor, cause the processor to:
determine a time of flight (TOF) of the transponded PN signal and a Doppler shift in the transponded KGL signal; and
determine orbit information of the satellite based on the TOF of the transponded PN signal and the Doppler shift in the transponded KGL signal.

2. The KGL satellite transceiver of claim 1, wherein the first frequency carrier and the second frequency carrier comprise a same frequency carrier, and the pair of signals are transmitted at a selected transmitted interval that differs from a selected transponded interval at which the pair of transponded signals is received.

3. The KGL satellite transceiver of claim 1, wherein the first frequency carrier and the second frequency carrier comprise a different frequency carrier from each other.

4. The KGL satellite transceiver of claim 1, wherein the plurality of data and instructions, when executed by the processor, further cause the processor to: determine a TOF of a second PN signal and a Doppler shift in a second KGL signal to determine the orbit of the satellite, wherein the second PN signal includes a second transmitted PN signal and a second transponded PN signal, the second KGL signal includes a second transmitted KGL signal and a second transponded KGL signal, wherein the second transmitted PN signal and the second transmitted KGL signal are transmitted sequentially on a third frequency carrier from the KGL satellite transceiver to the satellite, and the second transponded PN signal and the second transponded KGL signal are retransmitted back from the satellite to the KGL satellite transceiver sequentially on a fourth frequency carrier, and wherein the first frequency carrier and the third frequency carrier comprise a different frequency carrier from each other, and the second frequency carrier and the fourth frequency carrier comprise a different frequency carrier from each other.

5. The KGL satellite transceiver of claim 1, wherein the KGL signal comprises one of a sinusoidal wave and a pulsed tone.

6. The KGL satellite transceiver of claim 1, wherein a Doppler shift in the transponded PN signal is utilized to determine the orbit of the satellite.

7. The KGL satellite transceiver of claim 1, wherein the plurality of data and instructions, when executed by the processor, further cause the processor to:
measure a roundtrip Doppler shift in the KGL signal from the KGL satellite transceiver to the satellite and back to the KGL satellite transceiver and generate a Doppler trend;
measure a roundtrip TOF of the PN signal from the KGL satellite transceiver to the satellite and back to the KGL satellite transceiver and generate a range measurement; and
combine the Doppler trend and the range measurement to determine the orbit information.

8. The KGL satellite transceiver of claim 7, wherein the orbit information includes a position, an elevation, a velocity, a direction, or a combinations thereof.

9. The KGL satellite transceiver of claim 1, wherein the signal receiver and the signal transmitter use a common transceiver and a common antenna.

10. The KGL satellite transceiver of claim 1, wherein the transmitter is further configured to transmit orbit determination information of the satellite to the satellite.

11. A method for determining an orbit of a satellite, comprising:
transmitting a pair of signals from a known ground location (KGL) satellite transceiver to the satellite, the pair of signals including a pseudonoise (PN) signal and a KGL signal, the pair of signals being transmitted sequentially on a first frequency carrier, wherein the satellite is operable to transpond the pair of signals on a second frequency carrier;
receiving, at the KGL satellite transceiver, a pair of transponded signals from the satellite on the second frequency carrier, the pair of transponded signals including a transponded PN signal and a transponded KGL signal;
determining a time of flight (TOF) of the transponded PN signal and a Doppler shift in the transponded KGL signal; and
determining orbit information of the satellite based on the TOF of the transponded PN signal and the Doppler shift in the transponded KGL signal.

12. The method of claim 11, wherein determining the orbit information further comprises:
measuring a roundtrip Doppler shift in the KGL signal from a KGL satellite transceiver to the satellite and back to the KGL satellite transceiver and generating a Doppler trend from the roundtrip Doppler shift;
measuring a roundtrip TOF of the PN signal from the KGL satellite transceiver to the satellite and back to the KGL satellite transceiver and generating a range measurement from the PN signal; and
combining the Doppler trend and the range measurement for orbit determination.

13. The method of claim 11, further comprising alternating transmission of the PN signal and the KGL signal from the KGL satellite transceiver to the satellite.

14. The method of claim 11, further comprising transmitting a pair of signals from a KGL satellite transceiver that has been relocated to an alternative location, and repeating a determination of the orbit of the satellite.

15. At least one non-transitory computer readable storage medium having a computer readable program code embodied therein, the computer readable program code adapted to be executed to perform the following:
transmitting a pair of signals from a known ground location (KGL) satellite transceiver to the satellite, the pair of signals including a pseudonoise (PN) signal and a KGL signal, the pair of signals being transmitted sequentially on a first frequency carrier, wherein the satellite is operable to transpond the pair of signals on a second frequency carrier;
receiving, at the KGL satellite transceiver, a pair of transponded signals from the satellite on the second frequency carrier, the pair of transponded signals including a transponded PN signal and a transponded KGL signal;
determining a time of flight (TOF) of the transponded PN signal and a Doppler shift in the transponded KGL signal; and
determining orbit information of the satellite based on the TOF of the transponded PN signal and the Doppler shift in the transponded KGL signal.

16. The at least one non-transitory machine readable storage medium of claim 15, wherein determining the orbit information further comprises:
measuring a roundtrip Doppler shift in the KGL signal from the KGL satellite transceiver to the satellite and back to a KGL satellite transceiver and generating a Doppler trend from the roundtrip Doppler shift;

measuring a roundtrip TOF of the PN signal from the KGL satellite transceiver to the satellite and back to the KGL satellite transceiver and generating a range measurement from the PN signal; and combining the Doppler trend and the range measurement.

17. The at least one non-transitory machine readable storage medium of claim 16, wherein the orbit information includes a position, an elevation, a velocity, a direction, or a combination thereof.

* * * * *